UNITED STATES PATENT OFFICE.

GEORGE A. MARSH, OF LITTLETON, MASSACHUSETTS, ASSIGNOR TO THE AVERY LACTATE COMPANY, OF PORTSMOUTH, NEW HAMPSHIRE.

MANUFACTURE OF LACTATES FOR THE PRODUCTION OF LACTIC ACID.

SPECIFICATION forming part of Letters Patent No. 290,253, dated December 18, 1883.

Application filed August 30, 1883. (No specimens.)

*To all whom it may concern:*

Be it known that I, GEORGE AUSTIN MARSH, of Littleton, in the county of Middlesex, and in the State of Massachusetts, have invented certain new and useful Improvements in the Manufacture of Lactic Acid and the Lactates; and I do hereby declare that the following is a full, clear, and exact description thereof.

My invention relates to the manufacture of lactic acid and the lactates, and will be more fully set forth hereinafter.

In carrying out my process, I take any starch-producing vegetable substance—such as the meal or flour of Indian corn, for example—and add thereto warm water, (preferably of a temperature between 104° and 113° Fahrenheit, though I do not confine myself to these limits,) using about thirty gallons of water to one hundred pounds of the meal, in ordinary cases, though these proportions are subject to variation, and I next add thereto, say, about four gallons of an active lactic ferment, which is about ten percentum of the mass of meal and water first mixed together, though more or less of the ferment may be employed. To this mixture I add a substance to neutralize the lactic acid as fast as formed. I prefer to use carbonate of lime, as this may be added all at once in the beginning of the process, but I may employ instead other neutralizing substances; but if I employ a strongly-alkaline neutralizing substance the said substance must be added continuously and gradually. Among the neutralizing substances which I may use are the carbonates of soda, potash, lime, magnesia, or zinc, or the oxides of lime, magnesia, or zinc, or the hydrates of soda, potash, lime, magnesia, or zinc; but, as stated, carbonate of lime is preferable in ordinary cases, inasmuch as its action is gradual and continuous and self-regulating, and by its use I avoid the necessity of repeated additions of the neutralizing substance. I usually add about one-half the quantity, by weight, of carbonate of lime to a given quantity of the meal, (for example, fifty pounds of the former to the one hundred pounds of the latter named in the illustration,) or a chemically-equivalent quantity of any of the other neutralizing substances named. The original temperature is substantially maintained throughout the entire process of fermentation and neutralization just described.

While I prefer to use corn-meal, on account of its cheapness and availability, I do not confine myself thereto, as I may use any amylaceous substance. In case I employ pure starch in the beginning of my process instead of starch-producing substances, it is necessary to add thereto sufficient nitrogenous matter to carry on the fermentation.

My process, as herein described, enables me to obtain a perfect fermentation of the starch in the meal or other substances, and I also obtain a much larger yield of acid than when the starch is first converted into vegetable sugar, thus overcoming the loss in the yield of starch occasioned by such conversion in all the other processes, so far as known to me, besides which I secure additional economy, both of time and expense, in the process of manufacture.

Having thus described my invention, what I claim as new, and desire to secure by Letters Patent, is—

The method of manufacturing lactic acid and the lactates by the fermentation of a starch-containing vegetable substance in its original form in the presence of water, and of an active lactic ferment sufficiently charged with a substance to neutralize the acid, substantially as set forth.

In testimony that I claim the foregoing I have hereunto set my hand, at Boston, in the county of Suffolk and State of Massachusetts, in the presence of two witnesses.

GEO. A. MARSH.

Witnesses:
 HAROLD G. UNDERWOOD,
 JOHN G. HATHAWAY.